Oct. 20, 1959     G. R. GAMERTSFELDER     2,909,773
ANTENNA PATTERN SYNTHESIZER
Filed Sept. 18, 1956

Inventor
GEORGE R. GAMERTSFELDER
By
Attorney

United States Patent Office 2,909,773
Patented Oct. 20, 1959

2,909,773

ANTENNA PATTERN SYNTHESIZER

George R. Gamertsfelder, Pleasantville, N.Y., assignor to General Precision Laboratory Incorporated, a corporation of New York Application September 18, 1956, Serial No. 610,612

11 Claims. (Cl. 343—100)

This invention relates to apparatus for synthesizing and displaying the radiation pattern of a linear array antenna.

The radiation pattern of a linear array antenna depends upon many factors including the spacing between elements, the phase of the energy radiated by each element, the power radiated by each element and the radiation pattern of the individual elements. If it is desired to know the radiation pattern for a particular array it may be calculated by a straightforward method. In the case of linear arrays having a uniform spacing between elements and a uniform phase progression from element to element, the calculation is comparatively simple, but if the spacing or the phase progression or both are non-uniform, the calculations become quite complex because of the number of parameters involved. The effort required to determine the characteristics of such an antenna would be greatly reduced if there were available an apparatus for simulating linear arrays having various parameters and for visually displaying the resulting radiation pattern. Such a device would also be useful for studying the effects of non-uniformities which might be inadvertently introduced into nominally uniform designs because of manufacturing inaccuracies, temperature changes, or other factors.

It is an object of this invention to synthesize the radiation pattern of a linear array antenna.

Another object is to display visually the radiation pattern of a simulated linear array antenna.

A further object is to generate a signal the time variation of which is similar to the spatial variation of the radiation of a linear array antenna.

Briefly stated, a preferred embodiment of the invention comprises apparatus for generating a plurality of pulsed oscillations which are added to form a composite signal which is displayed on an oscilloscope. Means are provided for varying the relative frequencies, phases and amplitudes of the oscillations so that the display may simulate the radiation pattern of various linear array antennas.

For a clearer understanding of the invention reference may be made to the following detailed description and the accompanying drawing, in which.

Figure 1:
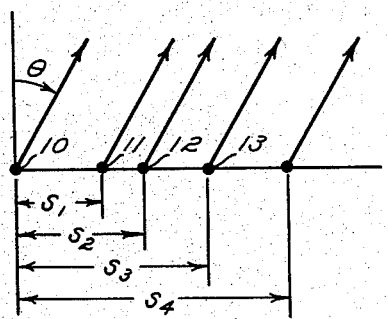
Figure 1 is a diagram useful in explaining the invention.

Referring first to Fig. 1, there is represented a linear array antenna comprising individual radiating elements 10, 11, 12, 13, etc., each of which is assumed to be an isotropic radiator. We wish to investigate the field strength due to all of the radiators at any distant point P which is far enough away so that (1) the attenuation of the energy emitted by the various radiators is substantially the same and (2) lines drawn from each radiator to the point P are substantially parallel. The field strength at point P is proportional to:

$$F(\Theta) = I_0 \sin \omega t + I_1 \sin \left( \omega t + 2\pi \frac{s_1}{\lambda} \sin \Theta + \phi_1 \right)$$
$$+ I_2 \sin \left( \omega t + 2\pi \frac{s_2}{\lambda} \sin \Theta + \phi_2 \right), \text{ etc.} \quad (1)$$

where $I_0$, $I_1$, $I_2$ etc. are the amplitudes of the currents in the individual radiating elements;
$\omega$ is the angular frequency of these currents;
$t$ is the time;
$s_1$, $s_2$ etc. are the distances from element 10 to elements 11, 12, 13 etc.;
$\lambda$ is the free space wavelength;
$\Theta$ is the angle between the normal to the array and a line drawn from any element to the point P; and
$\phi_1$, $\phi_2$ etc. represent the phase differences in the currents in the elements 11, 12, 13 etc. with respect to that in element 10.

The attenuation factor has been omitted since all attenuations are the same and we are interested only in the relative field strength at various angles.

Figure 2:
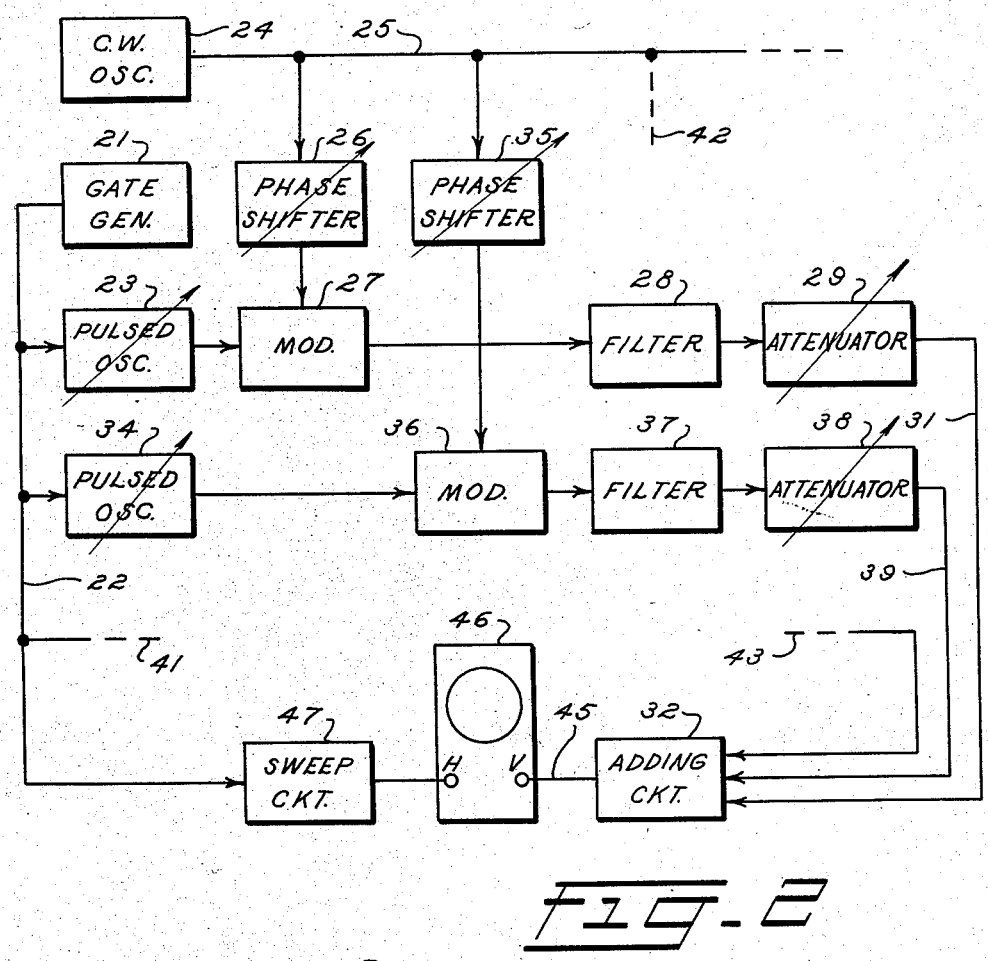
Figure 2 is a block diagram of a preferred embodiment of the invention.

The present invention is an analog device which synthesizes the radiation pattern of linear array antennas having any spacing, phase progression and illumination, uniform or non-uniform. In Fig. 2 there is shown a gate generator 21 for generating a continuous series of negative going rectangular waves which appear on conductor 22. By way of example the gate may have a duration of 4 milliseconds and have a repetition rate of 200 c.p.s. although these quantities are not at all critical.

A pulsed oscillator 23 is connected to the conductor 22 so as to be rendered operative during each negative gate. The oscillator 23 is adjustable in frequency and may, for example, have a range of adjustment from about 70 kc. p.s. to 90 kc. p.s. and is of the kind which can be gated on and off without the introduction of excessive transient distortion and which always starts with the same phase.

A continuously running oscillator 24 having a fixed frequency which may be about 100 kc. p.s. has its output connected to a conductor 25 to which, in turn, is connected an adjustable phase shifting circuit 26. The circuit 26 is capable of shifting the phase of the wave from oscillator 24 by any amount from 0° to 360°.

A modulator 27 is connected to both the pulsed oscillator 23 and the output of the phase shifter 26 and generates the usual modulation products which are passed to a filter circuit 28 which attenuates all of these products except the difference term which it passes freely. The filter 28 may be a low pass filter having a sharp cut off at about 40 kc. p.s. The output of the filter is passed through a variable attenuator 29 to the conductor 31 and thence to an adding circuit 32.

The pulsed oscillator 23, the phase shifter 26, the modulator 27, the filter 28 and the attenuator 29 comprise a chain of components which is duplicated for each individual radiating element in the antenna array the pattern of which is to be synthesized. In Fig. 2 there is shown one additional chain of components comprising a pulsed oscillator 34 connected to the conductor 22, a phase shifter 35 connected to the conductor 25, a modulator 36 receiving inputs from the oscillator 34 and the phase shifter 35 and delivering its output to a filter 37, an attenuator 38 connected to the filter 37 and an output conductor 39 connecting the attenuator 38 to the adding circuit 32. The dashed lines 41, 42 and 43 indicate the points of connection of additional chains of components.

The adding circuit 32 derives a voltage on its output conductor 45 the magnitude of which is proportional to the sum of the voltages impressed on its input and this summation voltage is applied to the vertical deflection system of a cathode ray oscilloscope 46. A sweep generating circuit 47 is connected to the conductor 22 and generates a sawtooth wave of the same duration as the negative gate, which wave is applied to the horizontal deflection system of the oscilloscope 46.

The variation with respect to time of the magnitude of the voltage on conductor 45 is an analog of the radiation pattern of a linear array antenna, as can be seen by considering the components making up this voltage. Consider first the voltage of conductor 31. Assume at first that the phase shifter 26 is adjusted for zero phase shift. The voltages from oscillators 23 and 24 will be mixed in the modulator 27, the filter 28 will remove all components except the difference frequency and the attenuator 29 will adjust the amplitude. The voltage on conductor 31 may be expressed as:

$$e_0 = E_0 \sin \Omega t \qquad (2)$$

If the phase shifter 35 is adjusted for zero phase shift the voltage of conductor 39 is of similar form but if the phase shifter is adjusted to some angle $\phi_1$ the voltage on conductor 39 may be expressed as:

$$e_1 = E_1 \sin (\Omega_1 t + \phi_1) \qquad (3)$$

The voltages $e_2$, $e_3$ etc. produced by the remaining chains of components will be similar in form to Equation 3 and the summation voltage $e_s$ appearing on conductor 45 may be expressed as:

$$e_s = E_0 \sin \Omega t + E_1 \sin (\Omega_1 t + \phi_1) \\ + E_2 \sin (\Omega_2 t + \phi_2), \text{ etc.} \qquad (4)$$

Let the differences in angular frequencies of $e_1$, $e_2$ etc. with respect to $e_0$ be denoted by $a_1$, $a_2$ etc. That is, let $$\Omega_1 = \Omega + a_1 \qquad (5)$$

$$\Omega_2 = \Omega + a_2 \qquad (6)$$

Equation 4 then becomes $$e_s = E_0 \sin \Omega t + E_1 \sin (\Omega t + a_1 t + \phi_1) \\ + E_2 \sin (\Omega t + a_2 t + \phi_2), \text{ etc.} \qquad (7)$$

Equation 7 is seen to be of the same form as Equation 1 the comparable terms being as follows:

| Equation 1 | Equation 7 |
| --- | --- |
| $F(\Theta)$ | $e_s$ |
| $I_n$ | $E_n$ |
| $\omega t$ | $\Omega t$ |
| $\frac{2\pi s_n}{\lambda}$ | $a_n$ |
| $\sin \Theta$ | $t$ |
| $\phi_n$ | $\phi_n$ |

The magnitude of the voltage on conductor 45 is thus seen to vary with time in a manner analogous to the way in which the field strength produced by a linear array antenna varies with the sine of the observation angle. It will be noted that the spacing, $s_n$, of each element 11, 12, 13 etc. from element 10 is analogous to $a_n$, which is proportional to the frequency difference between the voltage on conductor 31 and each of the remaining conductors 39, 43, etc.

As an illustrative example, suppose it is desired to display the radiation pattern of a six element array in which the spacings, phases and illuminations relative to the initial element 10 are as follows:

| Element | Spacing | Phase | Illumination |
| --- | --- | --- | --- |
| 10 | 0 | 0 | 1.0 |
| 11 | $0.2\lambda$ | $-\frac{\pi}{2}$ | 1.5 |
| 12 | $0.9\lambda$ | 0 | 2.0 |
| 13 | $1.5\lambda$ | $+\frac{\pi}{2}$ | 2.0 |
| 14 | $2.0\lambda$ | $-\frac{3\pi}{2}$ | 1.5 |
| 15 | $3.0\lambda$ | $+\pi$ | 1.0 |

First, the frequencies of the voltages on conductors 31, 39, etc. must be determined and the oscillators 23, 34 etc. adjusted accordingly. Two of the frequencies may be selected arbitrarily and it is advisable to set the oscillator 23 which corresponds to the first element 10 near the upper limit of its range, say at 90 kc. p.s. which, if the frequency of oscillator 24 is 100 kc. p.s., would make the frequency of conductor 31 equal to 10 kc. p.s. The greatest spacing is, of course, that of the last element 15 and the frequency of this oscillator should be selected near the lower end of its range, say at 72 kc. p.s., which would make the frequency of the last conductor leading to the adding circuit 28 kc. p.s. The spacing of the element 15 is $3\lambda$ which corresponds to a frequency difference of 18 kc. p.s. and the remaining frequencies are selected in the same proportion. For the example being considered the frequencies on conductors 31, 39, etc. will be 10, 11.2, 15.4, 19.0, 22.0 and 28 kc. p.s. and the corresponding frequencies of the pulsed oscillators 23, 34 etc. will be 90, 88.8, 84.6, 81, 78 and 72 kc.p.s. The actual adjustment of the oscillators is preferably made by using an oscilloscope to compare the frequency on conductors 31, 39 etc. with the frequency of a standard oscillator and adjusting the oscillators 23, 34 etc. accordingly.

The relative phases may be readily adjusted by simply setting the phase shifters which are preferably provided with an adjustment knob and a calibrated scale. Relative amplitudes may be adjusted with the attenuators and checked with a voltmeter.

Thus it is seen that the present invention enables the radiation pattern of any linear array antenna to be synthesized and displayed. The effect of varying any one or more of the parameters can be seen immediately without the necessity for laborious calculations.

What is claimed is:

1. Apparatus for generating a voltage the amplitude of which varies with time in a manner analogous to the manner in which the field strength of a linear array antenna varies with the angle of observation comprising, a plurality of transmission paths, means for simultaneously impressing a separate series of pulses of alternating current energy on each of said transmission paths, means for individually adjusting the frequencies of the energy within said pulses on each of said transmission paths in accordance with the spacing between the elements of a hypothetical linear array antenna, and an adding circuit connected to all of said transmission paths for deriving a voltage the magnitude of which is proportional to the sum of the voltages on said transmission paths.

2. Apparatus for generating a voltage which is an analog of the radiation pattern of a linear array antenna comprising, a plurality of oscillators, means for repeatedly starting and stopping the operation of all of said oscillators simultaneously, a plurality of modulators one connected to each of said oscillators, a continuously operating oscillator, means for connecting said continuously operating oscillator to each of said modulators, and an adding circuit connected to the output of all of said modulators.

3. Apparatus for generating and displaying an analog of the radiation pattern of a linear array antenna comprising, a plurality of oscillators, means for repeatedly starting and stopping the operation of all of said oscillators simultaneously, a plurality of modulators one connected to each of said oscillators, a continuously operating oscillator, means for connecting said continuously operating oscillator to each of said modulators, an adding circuit connected to the output of said modulators, and means for visually displaying the magnitude of the voltage output of said adding circuit as a function of time.

4. Apparatus for generating a voltage which is an analog of the radiation pattern of a linear array antenna comprising, a plurality of oscillators, means for repeatedly starting and stopping the operation of all of said oscillators simultaneously, a plurality of modulators one connected to each of said oscillators, a continuously operating oscillator, a plurality of phase shifting circuits all connected to the output of said continuously operating oscillator and each connected to one of said modulators, and an adding circuit connected to the output of all of said modulators.

5. Apparatus for generating a voltage which is an analog of the radiation pattern of a linear array antenna comprising, a plurality of oscillators, means for repeatedly starting and stopping the operation of all of said oscillators simultaneously, a plurality of modulators one connected to each of said oscillators, a continuously operating oscillator, a plurality of phase shifting circuits all connected to the output of said continuously operating oscillator and each connected to one of said modulators, a plurality of variable attenuators each connected to the output of one of said modulators, and an adding circuit connected to the output of all of said attenuators.

6. Apparatus for generating and visually displaying an analog of the radiation pattern of an linear array antenna comprising, a plurality of oscillators, means for repeatedly starting and stopping the operation of all of said oscillators simultaneously, a plurality of modulators one connected to each of said oscillators, a continuously operating oscillator, a plurality of phase shifting circuits all connected to the output of said continuously operating oscillator and each connected to one of said modulators, a plurality of variable attenuators each connected to the output of one of said modulators, an adding circuit connected to the output of all of said attenuators for deriving a voltage proportional to the sum of the voltage outputs of said attenuators, and means for visually displaying the magnitude of the voltage derived by said adding circuit as a function of time.

7. Apparatus for generating a voltage which is an analog of the radiation pattern of a linear array antenna comprising, a plurality of transmission paths, means for simultaneously impressing a separate series of alternating voltage pulses on each of said paths, means for individually adjusting the frequency of the voltage on each of said paths, and means for adding together the voltages on said transmission paths to obtain a composite voltage.

8. Apparatus according to claim 7 further comprising means for visually displaying the magnitude of said composite voltage as a function of time.

9. Apparatus for generating a voltage which is an analog of the radiation pattern of a linear array antenna comprising, a plurality of transmission paths, means for simultaneously impressing a separate series of alternating voltage pulses on each of said paths, means for individually adjusting the frequency of the voltage on each of said paths, means for individually adjusting the phases of the voltages on said paths relative to each other, and means for adding together the voltages of said paths.

10. Apparatus for generating a voltage which is an analog of the radiation pattern of the linear array antenna comprising, a plurality of transmission paths, means for simultaneously impressing a separate series of alternating voltage pulses on each of said paths, means for individually adjusting the frequency of the voltage on each of said paths, means for individually adjusting the phases of the voltages on said paths relative to each other, means for individually adjusting the amplitude of the voltages on said paths, and means for adding together the voltages on said paths to obtain a resulting voltage.

11. Apparatus according to claim 10 further comprising means for visually displaying the magnitude of said resulting voltage as a function of time.

References Cited in the file of this patent

UNITED STATES PATENTS

| | | |
|---|---|---|
| 2,337,968 | Brown | Dec. 28, 1943 |
| 2,568,927 | Morrison | Sept. 25, 1951 |
| 2,684,467 | Young et al. | July 20, 1954 |